Patented Oct. 4, 1949

2,483,960

UNITED STATES PATENT OFFICE 2,483,960

POLYMERIZATION OF VINYL HALIDES IN AN AQUEOUS DISPERSION

Massimo Baer, Springfield, Mass., assignor to Monsanto Chemical Company, St. Louis, Mo., a corporation of Delaware No Drawing. Application February 26, 1948, Serial No. 11,340

19 Claims. (Cl. 260—45.75)

This invention relates to the preparation of vinyl halide-containing polymer products. More particularly, this invention relates to the preparation of granular polymers of vinyl halide-containing materials.

In my co-pending patent application, Serial Number 691,412, filed August 17, 1946, now Patent Number 2,476,474, there is disclosed and claimed a process for the polymerization of vinyl halide-containing materials in aqueous suspension, there being dissolved in the aqueous phase thereof an heteropolymer of vinyl acetate and maleic acid or anhydride free from salt groups. This process leads to granular products of high quality. However, further improvement in this process is desirable in certain instances, for example, with respect to pH control.

It is an object of this invention to provide an improved process for preparing granular polymers of vinyl halide-containing materials. A particular object of this invention is to provide an improved method for polymerizing vinyl halide-containing materials in the presence of an heteropolymer of vinyl acetate and maleic acid or anhydride.

These and other objects are accomplished by polymerizing vinyl halide-containing materials in an aqueous suspension, the aqueous phase thereof containing a water-insoluble salt of a metal from the group lead, barium and calcium with an heteropolymer of vinyl acetate and maleic acid or anhydride. Surprisingly, these water-insoluble salts function effectively as dispersing agents to produce granular polymers. Furthermore, the use of these salts permits variation in and control of the pH of the polymerizing mixture which is not attained when unreacted heteropolymer is the sole suspending agent.

The following examples are illustrative of the present invention, but are not to be considered as limitative thereof. Where parts are mentioned, they are parts by weight.

The procedure used in the examples in the table is the same in each case except for the variation in quantities of certain components as set forth in the table. The heteropolymer of vinyl acetate and maleic anhydride is dissolved in a sufficient amount of the water to form a 1% solution. The remainder of the water and the basic lead carbonate in finely divided form are mixed and the mixture introduced in a colloid mill to produce a fine suspension of the lead carbonate in water. Thereafter, the solution of the heteropolymer is also introduced into the colloid mill.

The resulting aqueous product is then placed in a stainless steel autoclave and there are added 0.2 part of lauroyl peroxide. After sweeping out the air with vinyl chloride gas, the autoclave is sealed and 100 parts of monomeric vinyl chloride are introduced. The resulting mixture is heated and stirred at 50° C. for 20 hours. As a result of this treatment, substantially all of the vinyl chloride is polymerized, i. e., more than 95%. The polymer is recovered in the form of a fine powder by centrifuging the product to separate the suspending medium. The polymer may be further purified by washing with water and drying.

The heteropolymer used in the examples is made by copolymerizing one gram molecular weight of vinyl acetate with one gram molecular weight of maleic anhydride in the presence of 60 cc. of benzene and 0.13 gram of benzoyl peroxide at 50° C. for 72 hours. The product, after being freed from the benzene by drying at 60–70° C., is in the form of a fine powder.

Table

| Example | Water | Basic Lead Carbonate | Hetero-polymer | Initial pH | Final pH |
|---|---|---|---|---|---|
|  | Parts | Parts | Parts |  |  |
| I | 200 | 3 | 0.4 | 5.1 | 5.1 |
| II | 200 | 3 | 0.3 | 5.8 | 5.5 |
| III | 200 | 3 | 0.2 | 5.8 | 5.6 |
| IV | 200 | 3 | 0.1 | 5.85 | 5.6 |
| V | 200 | 3 | 0.05 | 6.2 | 5.8 |
| VI | 200 | 0.3 | 0.4 | 4.0 | 3.65 |
| VII | 200 | 0.3 | 0.3 | 4.2 | 3.8 |
| VIII | 200 | 0.3 | 0.2 | 5.2 | 4.9 |
| IX | 200 | 0.3 | 0.1 | 5.55 | 5.1 |

It is evident from the data set forth in the table that the use of basic compounds such as basic lead carbonate provides an effective means of buffering polymerization charges in which heteropolymers of vinyl acetate and maleic acid or anhydride are used as suspending agents.

In contrast to the results in Examples I–IX, coagulation resulted in another experiment in which a solution of 2 parts of basic lead carbonate in 200 parts of water was used as the dispersion medium in the absence of any heteropolymer.

The process of the invention, as illustrated by the examples, possesses numerous advantages. Thus, as indicated by the pH values set forth in the table, the inclusion of a basic-reacting lead, barium or calcium compound causes the reaction mixture to be effectively buffered. A further unexpected advantage in the new process is the reduction in the corrosiveness of the polymerizing mixture so that reaction vessels constructed from a wider variety of materials may be used. Furthermore, these and other advantages are attained without impairment of the electrical characteristics of the polymer.

A particular advantage of the process of the invention resides in the fact that the product obtained by reaction in metallic vessels is free from contamination and little or no fouling of the walls of the reaction vessel occurs due to sticking of the polymer thereto.

The amount of heteropolymer salt used in any particular polymerization mixture depends on a number of factors, e. g., ratio of water to monomer. Thus, as the water:monomer ratio is increased, the ratio of suspending agent to water may be decreased if the same average particle size is desired in the polymer. Likewise, the suspending agent:water ratio may be decreased as the rate of polymerization is increased to provide polymer particles of the same average size. Other factors affecting the amount of suspending agent include the degree of fineness desired in the polymer particles and the speed of agitation.

Usually the amount of suspending agent used is such as to produce a polymeric product with the desired average particle size. Frequently, there is found to be an optimum amount of suspending agent for achieving minimum particle size and amounts of suspending agent above or below this optimum amount produce polymers having a lower particle size. It is usually preferred to use the smallest amount of suspending agent that will produce polymer of the desired particle size. In any event, the amount of suspending agent should not be so large as to interfere with efficient agitation. Generally, the heteropolymer content thereof is equal to 0.001–2.0% and preferably, 0.005–0.5% of the weight of the water used. The weight of the salt thereof which is used will depend on the molecular weight of the salt-forming material and the amount reacted with the heteropolymer.

The relative amounts of metal compound and heteropolymer used to form the suspending agent depends on the pH conditions desired during the polymerization. Usually the amount of the basic compound is about the amount required to neutralize the acyl groups in the heteropolymer. Larger or smaller amounts may be used when desired, i. e., the suspending agent may comprise a mixture of heteropolymer salt and unreacted heteropolymer or unreacted metal compound. However, it is contemplated that usually no more than a 50% excess of either component on a stoichiometric basis will be required to achieve the desired pH conditions.

Various means may be used for preparing the suspending agent salts of the invention. While admixture of the components in the presence of water in a colloid mill is advantageous in that the resulting insoluble salt is obtained in a very finely divided form, other means may be used. Thus, effective suspending agents may be prepared by stirring together an aqueous solution of the heteropolymer with an aqueous solution or suspension of the lead, calcium or barium compound, or either component in a dry state may be admixed with an aqueous suspension or solution of the other component. Thereafter, the resulting insoluble salt may be reduced in particle size, if desired, by means of a colloid mill, by grinding, etc. Another method is to admix both components in a dry state and thereafter incorporate water therewith.

The metallic compounds used to form the insoluble salts with the heteropolymer may be various basic-reacting compounds of lead, barium or calcium. Examples of such compounds are salts, oxides and hydroxides of these metals such as lead hydroxide, basic lead carbonate, lead borate, lead carbonate, lead oxides, calcium formate, calcium borate, calcium oxide, calcium hydroxide, calcium lactate, calcium carbonate, calcium citrate, barium oxide, barium citrate, barium silicate, barium formate, barium propionate, barium butyrate, barium hydroxide, barium acetate, barium carbonate, barium malate, barium malonate, barium oxide, barium phosphates, barium succinate, etc. Also mixtures of these and other basic compounds of barium, calcium and lead may be used.

Of the various basic compounds of lead, barium and calcium which may be used in making the suspending agents, the hydroxides and salts of weak acids, e. g., the carbonates and salts of organic acids are preferred. Also when the reaction is carried out in an aqueous slurry, compounds having a solubility in water at ordinary temperatures, i. e., 20–30° C., of at least 0.01% and more particularly, at least 1%, are preferred.

The heteropolymers of vinyl acetate and maleic acid or anhydride used in making the suspending agents of the invention may be made by usual methods of producing such polymeric products, e. g., in solution, in mass, or in a liquid which is a solvent for the monomeric materials, but not for the heteropolymer. Illustrative examples are set forth in my co-pending patent application, Serial No. 691,412, filed August 17, 1946. A particularly preferred procedure is set forth in my co-pending application, Serial No. 790,221, filed December 6, 1947, whereby especially high molecular weight products are obtained by polymerization in the presence of a small amount of material which is a solvent for the monomeric materials, but not for the heteropolymer.

Usually maleic anhydride is preferred over maleic acid as the copolymerizing material, in view of the faster polymerization rates which result and the greater solubility of the anhydride. Since, on solution of the vinyl acetate-maleic anhydride heteropolymer in water, the anhydride groups hydrolyze to carboxyl groups, there is no disadvantage in using this heteropolymer.

The heteropolymers may be made by polymerizing mixtures of vinyl acetate and maleic acid or anhydride in varying molar ratios, e. g., from 1:9 to 9:1. Usually, it is preferred that the ratio of maleic acid or anhydride to vinyl acetate does not exceed 1:1 since the use of an excess of maleic acid or anhydride may be undesirable in some cases. On the other hand, it may be desirable that the ratio of vinyl acetate to maleic acid or anhydride exceed 1:1. For example, the ratio may be as high as 9:1, as pointed out above. However, a preferred range of proportions is to use 1–2 mols of vinyl acetate for every mol of maleic acid or anhydride.

In carrying out the process of the invention, the polymerizing temperature may be substantially varied, and the temperature employed is governed by the particular characteristics desired in the polymeric material and the nature of the material being polymerized. In the case of vinyl halides and many mixtures of vinyl halides and materials copolymerizable therewith, temperatures of 30–100° C. are usually employed.

The weight ratio of water:monomer used in the process of the invention may be substantially varied. Usually, it is preferred that weight of water at least equals the weight of monomer but, generally, not more than 9 parts by weight of water are used for every part of monomer.

As indicated above, it is desirable in carrying out the polymerization process of the invention to substantially free from oxygen the atmosphere above the charge by replacing the air prior to polymerization with carbon dioxide, vinyl chloride, nitrogen or other inert gas. This may be done by sweeping out the air with a stream of inert gas or by subjecting the polymerization charge to partial vacuum, thereby sweeping out the air with vapors from the charge.

The process of this invention is useful in the polymerization of vinyl halides, e. g., vinyl chloride, vinyl bromide, etc. and the copolymerization of vinyl halides with such copolymerizable water-insoluble unsaturated compounds as vinyl esters of carboxylic acids, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; vinyl aromatic compounds, for example, styrene, ortho-chlorostyrene, para-chlorostyrene, 2,5-dichlorostyrene, 2,4-dichlorostyrene, para-ethyl styrene, divinyl benzene, vinyl naphthalene, alpha-methyl styrene; dienes such as butadiene, chloroprene; amides such as acrylic acid amide, acrylic acid anilide; nitriles, such as acrylic acid nitrile; esters of $\alpha,\beta$-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like.

Preferably, in the case of copolymerization, a predominant portion, i. e., more than 50% by weight of the mixture of monomers is a vinyl halide, especially vinyl chloride.

A particularly preferred embodiment of the invention comprises the polymerization of a mixture of vinyl chloride and an ester of an $\alpha,\beta$-unsaturated dicarboxylic acid such as diethyl maleate, in which 5-20 parts by weight of the ester are used for every 95-80 parts by weight of vinyl chloride. Among the preferred esters of $\alpha,\beta$-unsaturated dicarboxylic acids are the alkyl esters in which the alkyl group contains 2-8 carbon atoms.

In place of lauroyl peroxide used in the examples, other water-insoluble catalysts may be used, such as benzoyl peroxide, ditertiary butyl peroxide, oleyl peroxide, toluyl peroxide and the like. Mixtures of two, three or more of these and other catalysts may be used when desired. In certain cases, the catalyst may be eliminated, for example, when rapid polymerization is obtained in the absence of catalyst. In certain cases, the action of light may be helpful in expediting the polymerization.

The above catalysts are also illustrative of catalysts which may be used in making the heteropolymer dispersing agent.

The foregoing description is given in illustration and not in limitation of the invention as set forth in the appended claims.

What is claimed is:

1. A process for preparing granular polymeric products which comprises polymerizing in an aqueous dispersion a polymerizable material containing a vinyl halide from the group consisting of vinyl chloride and vinyl bromide, said dispersion also containing a water-insoluble reaction product of a basic compound of a metal from the group consisting of lead, barium and calcium and a maleic-vinyl acetate heteropolymer.

2. A process as defined in claim 1 in which the basic compound is a lead compound.

3. A process as defined in claim 2 in which the lead compound is a lead salt of a weak acid.

4. A process as defined in claim 3 in which the lead salt is basic lead carbonate.

5. A process as defined in claim 1 in which the polymerizable material is vinyl chloride.

6. A process as defined in claim 5 in which the basic compound is a lead compound.

7. A process as defined in claim 6 in which the lead compound is a lead salt of a weak acid.

8. A process as defined in claim 7 in which the lead salt is basic lead carbonate.

9. A process as defined in claim 1 in which the polymerizable material is a mixture of vinyl chloride and an unsaturated compound copolymerizable therewith.

10. A process as defined in claim 9 in which the basic compound is a lead compound.

11. A process as defined in claim 10 in which the lead compound is a lead salt of a weak acid.

12. A process as defined in claim 11 in which the lead salt is basic lead carbonate.

13. A process as defined in claim 9 in which the unsaturated compound is a vinyl ester of a lower aliphatic acid.

14. A process as defined in claim 9 in which the unsaturated compound is vinyl acetate.

15. A process as defined in claim 9 in which the unsaturated compound is an alkyl ester of an alpha, beta-dicarboxylic acid.

16. A process as defined in claim 9 in which the unsaturated compound is diethyl maleate.

17. A process as defined in claim 16 in which the basic compound is a lead compound.

18. A process as defined in claim 17 in which the lead compound is a lead salt of a weak acid.

19. A process as defined in claim 18 in which the lead salt is basic lead carbonate.

MASSIMO BAER.

No references cited.